US010453624B2

(12) United States Patent
Tu et al.

(10) Patent No.: US 10,453,624 B2
(45) Date of Patent: Oct. 22, 2019

(54) ELECTRICAL CONNECTOR DEVICE INCLUDING HEAT TRANSFER DEVICE AND METHOD OF MANUFACTURING SAME

(71) Applicant: ABB Schweiz AG, Baden (CH)

(72) Inventors: Zhiyu Tu, ShangHai (CN); Wei Wang, ShangHai (CN); Xuhui Ren, ShangHai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/744,374

(22) PCT Filed: Jul. 29, 2015

(86) PCT No.: PCT/CN2015/085389
§ 371 (c)(1),
(2) Date: Jan. 12, 2018

(87) PCT Pub. No.: WO2017/015889
PCT Pub. Date: Feb. 2, 2017

(65) Prior Publication Data
US 2018/0261405 A1 Sep. 13, 2018

(51) Int. Cl.
*H01H 1/62* (2006.01)
*H01H 9/52* (2006.01)
(Continued)

(52) U.S. Cl.
CPC ............... *H01H 1/62* (2013.01); *H01H 9/52* (2013.01); *H02B 1/56* (2013.01); *H02B 11/04* (2013.01)

(58) Field of Classification Search
CPC ...... F28D 15/02; F28D 15/0233; F28D 15/04; F28D 15/0275; H02G 5/08; H01H 1/42; (Continued)

(56) References Cited

U.S. PATENT DOCUMENTS 3,662,137 A   5/1972   Cleaveland
5,974,556 A * 10/1999   Jackson et al. ........... G06F 1/00
                                                        713/322
(Continued)

FOREIGN PATENT DOCUMENTS

CN    2572709 Y    9/2003
CN    1967130 A    5/2007
(Continued)

OTHER PUBLICATIONS

Machine Translation and International Search Report and Written Opinion issued in connection with corresponding PCT Application No. PCT/CN2015/085389 dated May 6, 2016.
(Continued)

*Primary Examiner* — Gary F Paumen
(74) *Attorney, Agent, or Firm* — Barnes & Thornburg LLP

(57) ABSTRACT

An electrical connector device for connecting a bus bar to one or more electrical contacts of a circuit interrupting device is provided. The electrical connector device includes an electrically conductive body having a first end configured to engage the one or more electrical contacts of the circuit interrupting device, and a second end configured to engage the bus bar. The electrically conductive body includes a central portion and an outer portion, and has a cavity defined therein between the central portion and the outer portion. The electrical connector device also includes an evaporative heat transfer device including a wick and a working fluid each disposed within the cavity defined within the electrically conductive body. The heat transfer device is configured to facilitate heat transfer from the first end of the electrically conductive body to the second end.

18 Claims, 5 Drawing Sheets

(51) Int. Cl.
*H02B 1/56* (2006.01)
*H02B 11/04* (2006.01)

(58) Field of Classification Search
CPC ........ H01H 1/62; H01H 9/52; H01L 23/4006; H01R 23/7073; F21V 29/004; H02B 11/04; H02B 1/56
USPC ...................... 439/251, 485, 487; 165/104.26
See application file for complete search history.

(56) References Cited

U.S. PATENT DOCUMENTS

| | | | |
|---|---|---|---|
| 8,695,358 B2 | 4/2014 | Kaufmann et al. | |
| 8,717,745 B2 | 5/2014 | Frigiere et al. | |
| 8,835,782 B2 | 9/2014 | Fischer-Carne et al. | |
| 2007/0107877 A1* | 5/2007 | Hou | F28D 15/025 165/104.26 |
| 2010/0132925 A1* | 10/2010 | Lewis | F28D 15/02 165/104.26 |
| 2012/0297798 A1* | 11/2012 | Kaufmann | H01H 9/52 62/62 |
| 2013/0107458 A1 | 5/2013 | Tong et al. | |
| 2013/0250490 A1 | 9/2013 | Kaufmann et al. | |
| 2013/0319024 A1 | 12/2013 | Fischer-Carne | |
| 2014/0138357 A1 | 5/2014 | Kasza et al. | |
| 2014/0368976 A1 | 12/2014 | Wu et al. | |
| 2015/0047372 A1* | 2/2015 | Kaufmann | H01H 9/52 62/62 |

FOREIGN PATENT DOCUMENTS

| | | |
|---|---|---|
| CN | 101320651 A | 12/2008 |
| CN | 102334004 A | 1/2012 |
| CN | 102353147 A | 2/2012 |
| CN | 103597678 A | 2/2014 |
| CN | 104170042 A | 11/2014 |
| CN | 104595056 A | 5/2015 |
| EP | 2 677 611 A1 | 12/2013 |

OTHER PUBLICATIONS

Machine Translation and International Preliminary Report on Patentability issued in connection with corresponding PCT Application No. PCT/CN2015/085389 dated Jan. 30, 2018.
China National Intellectual Property Administration, First Office Action for Chinese Patent Application No.: 201580082038.0, dated Sep. 26, 2018, 17 pages (including translation).

* cited by examiner

ELECTRICAL CONNECTOR DEVICE INCLUDING HEAT TRANSFER DEVICE AND METHOD OF MANUFACTURING SAME

BACKGROUND

The field of the disclosure relates generally to electrical switchgear systems, and more particularly, to electrical connector devices configured to facilitate heat dissipation within electrical switchgear systems.

Electrical systems, such as power generation, power transmission, power distribution, and power conversion systems, often include switchgear systems used to control, protect, and/or isolate electrical equipment within the electrical system. Switchgear systems generally include a combination of bus bars, electrical cables, circuit breakers, electrical switches, and/or fuses electrically connected in a desired manner to control, protect, and/or isolate the electrical equipment of electrical systems. Such systems generally include numerous electrical connections and contact points, many of which act as heat generation sources during operation of the switchgear system due to high currents passing through the electrical connections and contact points.

Heat generation at certain electrical connections and contact points in switchgear systems, if not managed or controlled, may cause excessive heating of the electrical connections and contact points, which can adversely affect the performance and/or integrity of the switchgear system. While several attempts have been made to improve heat dissipation and heat transfer within switchgear systems, known heat transfer devices provide less than satisfactory heat dissipation and heat transfer performance for certain applications.

For example, at least some known switchgear systems utilize heat tubes to transfer or dissipate heat away from heat generation sources. However, known heat tubes used in switchgear systems have relatively complex structures or assemblies, including multiple components and/or having multiple electrical contact interfaces. Additionally, at least some known heat tubes used in switchgear systems have a limited number of heat exchange surfaces, thereby limiting the effectiveness of thermal conduction away from heat sources.

BRIEF DESCRIPTION

In one aspect, an electrical connector device for connecting a bus bar to one or more electrical contacts of a circuit interrupting device is provided. The electrical connector device includes an electrically conductive body having a first end configured to engage the one or more electrical contacts of the circuit interrupting device, and a second end configured to engage the bus bar. The electrically conductive body includes a central portion and an outer portion, and has a cavity defined therein between the central portion and the outer portion. The electrical connector device also includes an evaporative heat transfer device including a wick and a working fluid each disposed within the cavity defined within the electrically conductive body. The heat transfer device is configured to facilitate heat transfer from the first end of the electrically conductive body to the second end.

In another aspect, an electrical switchgear system is provided. The electrical switchgear system includes a circuit breaker including at least one electrical contact, a bus bar, and an electrical connector device configured to conduct electrical current between the bus bar and the circuit breaker. The electrical connector device includes an electrically conductive body having a first end releasably coupled to the at least one electrical contact, and a second end coupled to the bus bar. The electrically conductive body includes a central portion and an outer portion, and has a cavity defined therein between the central portion and the outer portion. The electrical connector device also includes an evaporative heat transfer device including a wick and a working fluid each disposed within the cavity defined within the electrically conductive body. The heat transfer device is configured to facilitate heat transfer to the bus bar.

In yet another aspect, a method of manufacturing an electrical connector device including an evaporative heat transfer device is provided. The method includes providing an electrically conductive body, forming a cavity in the electrically conductive body such that the cavity is defined between a central portion of the electrically conductive body and an outer portion of the electrically conductive body, and forming an evaporative heat transfer device within the electrically conductive body. Forming the evaporative heat transfer device includes providing a wick within the cavity, providing a working fluid within the cavity, and sealing the cavity.

Although specific features of various embodiments may be shown in some drawings and not in others, this is for convenience only. Any feature of any drawing may be referenced and/or claimed in combination with any feature of any other drawing.

DETAILED DESCRIPTION

Exemplary embodiments of electrical connector devices and methods of manufacturing electrical connector devices are described herein. The electrical connector devices generally include an electrically conductive body having a cavity defined therein that extends around a central portion of the electrically conductive body, and an evaporative heat transfer device comprising a wick and a working fluid each disposed within the cavity defined within the electrically conductive body. The heat transfer device is configured to facilitate heat transfer within switchgear systems in which the electrical connector devices are installed.

As compared to some known electrical connector devices, the electrical connector devices described herein utilize an evaporative heat transfer device having a greater number of heat exchange interfaces and surfaces, thereby improving heat transfer and dissipation away from heat generation sources. In particular, the electrical connector devices described herein include a heat transfer device having inner and outer heat exchange interfaces, more specifically, radially inner and outer heat exchange interfaces. Moreover, the electrical connector devices described herein include an electrically conductive body having an outer heat transfer surface and an inner heat transfer surface. The inner and outer heat transfer surfaces and heat exchange surfaces provide a greater number of heat exchange surfaces and overall surface area through which heat can be transferred and dissipated as compared to some known electrical connector devices. Moreover, the electrical connector devices described herein include a unitary or monolithic electrically conductive body, which improves thermal conduction and reduces the number of electrical connection interfaces as compared to some known electrical connector devices.

Figure 1:
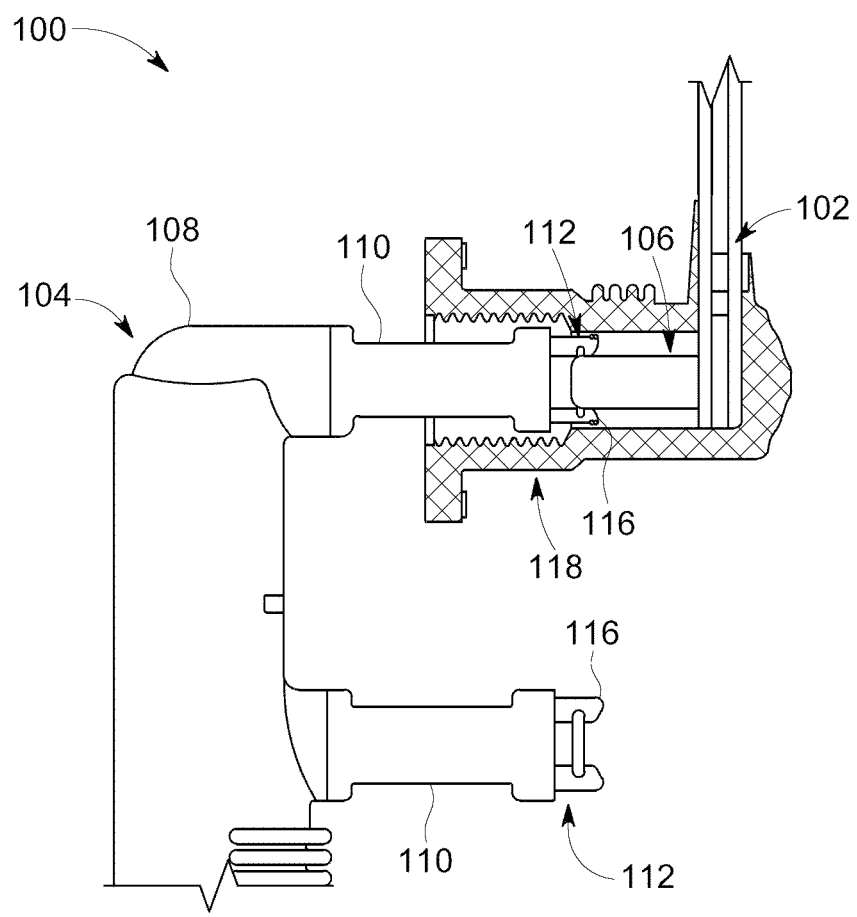
FIG. 1 is a side view of an exemplary switchgear system including an exemplary electrical connector device, wherein portions of the switchgear system are cut away to show underlying features of the switchgear system.
Figure 2:
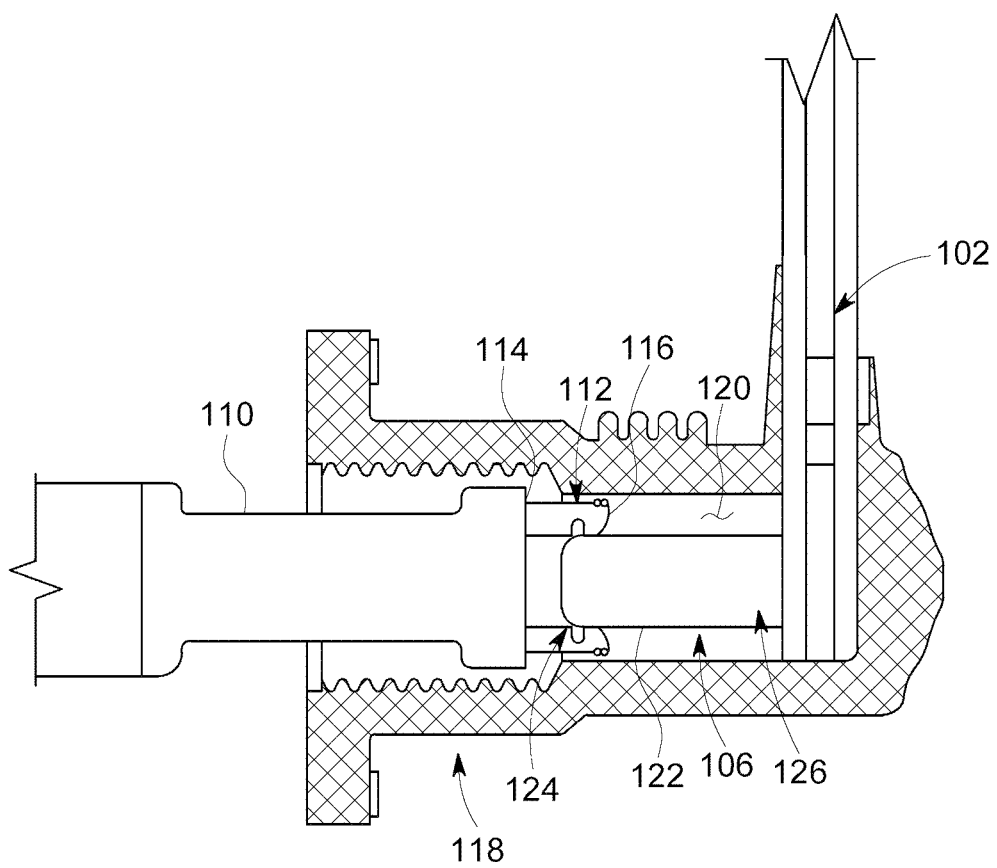
FIG. 2 is an enlarged view of a portion of the switchgear system shown in FIG. 1.

FIG. 1 is a side view of an exemplary switchgear system 100, and FIG. 2 is an enlarged view of a portion of switchgear system 100 shown in FIG. 1. As shown in FIGS. 1 and 2, switchgear system 100 includes a bus bar 102, a circuit interrupting device, shown in the form of a circuit breaker 104, and an electrical connector device 106 electrically coupled between bus bar 102 and circuit breaker 104. Although switchgear system 100 is described herein with reference to a circuit breaker, switchgear system 100 may include electrical devices other than circuit breakers, such as circuit switching devices and circuit interrupters other than circuit breakers, such as contactors, motor starters, motor controllers and other load controllers. Bus bar 102 is electrically coupled to a main power supply (not shown), such as a three-phase power supply, and circuit breaker 104 is electrically coupled to bus bar 102 via electrical connector device 106. In operation, switchgear system 100 is used to control the distribution of electrical power from the main power supply to one or more branch circuits electrically coupled to the power supply through one or more of circuit breakers 104. In the exemplary embodiment, switchgear system 100 is a medium-voltage switchgear system 100 rated for operation at voltages greater than or equal to 1 kilovolt (kV) up to voltages of about 40 kV. In other embodiments, switchgear system 100 may be a switchgear system other than a medium-voltage switchgear system, and/or be rated for operation at voltages less than 1 kV or greater than 40 kV.

Bus bar 102 is constructed from an electrically conductive material, and is configured to conduct electrical current from a power supply. Suitable materials from which bus bar 102 may be constructed include, for example and without limitation, copper, aluminum, and combinations thereof.

Circuit breaker 104 includes a plurality of breaker poles 108, only one of which is shown in FIGS. 1 and 2. Each breaker pole 108 is configured to be electrically coupled to one phase of a multi-phase power supply. In some embodiments, circuit breaker 104 includes three breaker poles 108, and each breaker pole 108 is configured to be electrically coupled to one phase of a three-phase power supply. In other embodiments, circuit breaker 104 may include any suitable number of breaker poles that enables switchgear system 100 to function as described herein.

Each breaker pole 108 includes two breaker arms 110. One of breaker arms 110 is coupled to electrical connector device 106, and the other of breaker arms 110 is configured to be electrically coupled to a branch circuit via an electrical connector, such as another electrical connector device 106. Each breaker arm 110 includes at least one electrical contact 112 configured to releasably engage an electrical connector, such as electrical connector device 106. In the exemplary embodiment, each breaker arm 110 includes a plurality of electrical contacts 112 disposed circumferentially around a distal end 114 (FIG. 2) of breaker arm 110. Only two electrical contacts 112 are shown for each breaker arm 110 in FIGS. 1 and 2, although breaker arms 110 may include any suitable number of electrical contacts that enables switchgear system 100 to function as described herein.

Moreover, in the exemplary embodiment, electrical contacts 112 include flexible finger contacts 116 configured to deflect radially outward and inward upon engaging and disengaging electrical connector device 106, respectively. Inherent elastic forces of finger contacts 116 create a biasing force that biases finger contacts 116 into engagement with electrical connector device 106 when circuit breaker 104 is coupled to electrical connector device 106.

In the exemplary embodiment, circuit breaker 104 is a track-mounted circuit breaker that can be coupled and decoupled from electrical connector device 106 by moving circuit breaker 104 towards and away from electrical connector device 106 along tracks or wheels (not shown). Electrical contacts 112 of circuit breaker 104 are configured to engage and disengage electrical connector device 106 as circuit breaker 104 is moved towards and away from electrical connector device 106, respectively.

In the exemplary embodiment, switchgear system 100 also includes an insulating sheath or sleeve 118 extending around electrical connector device 106 to provide electrical isolation between electrical connector device 106 and the surrounding environment. As shown in FIG. 2, insulating sleeve 118 defines an enclosed space 120 in which electrical connector device 106 is disposed. When circuit breaker 104 is coupled to electrical connector device 106, electrical contacts 112 are also disposed within enclosed space 120. Air circulation within enclosed space 120 is generally less than around other areas of switchgear system 100, and thus, heat generated within enclosed space 120 is not dissipated as well as in other areas of switchgear system 100. As described in more detail herein, electrical connector device 106 is configured to facilitate heat dissipation from within enclosed space 120.

Electrical connector device 106 includes an electrically conductive body 122 having a first end 124 configured to releasably engage electrical contacts 112 of circuit breaker 104, and a second end 126 configured to engage bus bar 102. In the exemplary embodiment, second end 126 of electrically conductive body 122 is fixed to bus bar 102.

Electrically conductive body 122 is constructed from an electrically conductive material, and is configured to conduct electrical current between bus bar 102 and circuit breaker 104. Suitable materials from which bus bar 102 may be constructed include, for example and without limitation, copper, aluminum, and combinations thereof. In some embodiments, electrically conductive body 122 is constructed as a monolithic or unitary piece of conductive material. Constructing electrically conductive body 122 as a monolithic or unitary piece of conductive material reduces the number of thermal and electrical connection interfaces within switchgear system 100 as compared to other known electrical connector devices, thereby enhancing the electrical and thermal conduction performance of electrical connector device 106.

As noted above, heat generated at and around the connection point between electrical contacts 112 of circuit breaker 104 and electrical connector device 106 (i.e., at first end 124 of electrical connector device 106) is not dissipated as well as in other areas of switchgear system 100 due, in part, to enclosed space 120 defined by insulating sleeve 118.

Heat generated within enclosed space 120 is generally transferred from electrical contacts 112 of circuit breaker 104 to bus bar 102 through electrical connector device 106 due to the relatively large thermal mass of bus bar 102 compared to the thermal mass of thermally conductive components of circuit breaker 104. Thus, bus bar 102 acts as a heat sink for switchgear system 100. As described below, the electrical connector devices described herein are configured to facilitate heat dissipation of heat generated within and around insulating sleeve 118. In particular, the electrical connector devices described herein include evaporative heat transfer devices configured to facilitate heat transfer from first end 124 of electrical connector device 106 to bus bar 102.

Figure 3:
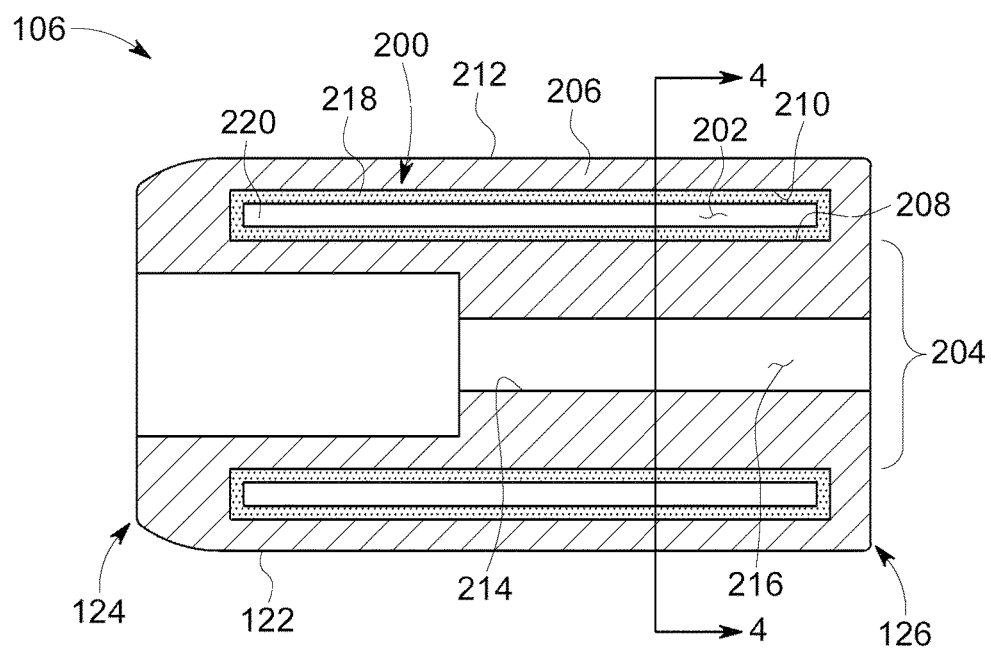
FIG. 3 is a cross-section of the electrical connector device shown in FIGS. 1 and 2 including an evaporative heat transfer device.
Figure 4:
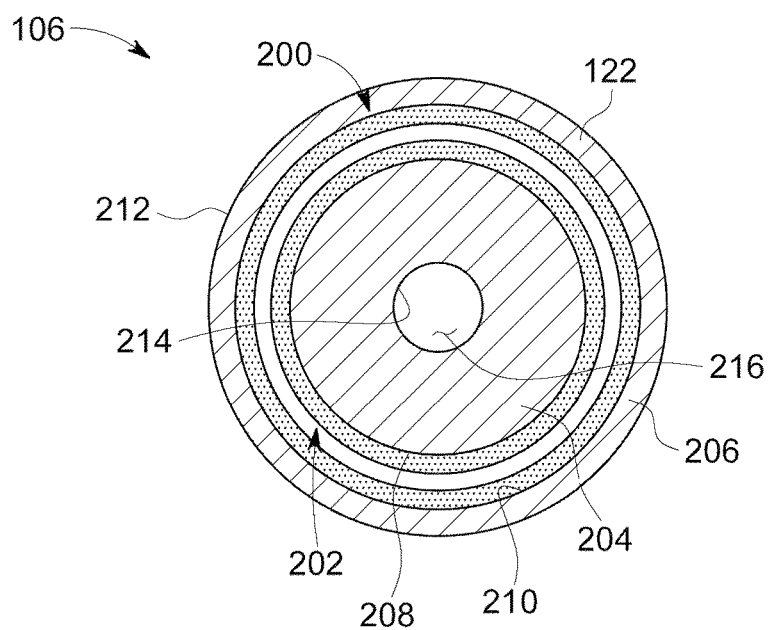
FIG. 4 is a cross-section of the electrical connector device shown in FIG. 3 taken along line 4-4 in FIG. 3.

FIG. 3 is a cross-section of electrical connector device 106 shown in FIGS. 1 and 2, and FIG. 4 is a cross-section of electrical connector device 106 shown in FIG. 3 taken along line 4-4 in FIG. 3. As shown in FIGS. 3 and 4, electrical connector device 106 includes an evaporative heat transfer device 200 formed within a cavity 202 defined by electrically conductive body 122.

More specifically, electrically conductive body 122 has cavity 202 defined therein that extends around a central portion 204 of electrically conductive body 122. Cavity 202 is defined between central portion 204 of electrically conductive body 122 and a radial outer portion 206 (generally, an outer portion) of electrically conductive body 122. Cavity 202 is hermetically sealed, and completely enclosed within electrically conductive body 122. In the exemplary embodiment, cavity 202 is an annular cavity having a ring-shaped cross-section. In other embodiments, cavity 202 may be other than an annular cavity and have a cross-section other than a ring-shaped cross-section.

Radial outer portion 206 of electrically conductive body 122 is a portion of electrically conductive body 122 that is located further away from a longitudinal axis of electrically conductive body 122 in a radial direction than central portion 204. The term "radial" refers to a direction perpendicular to the longitudinal axis of electrically conductive body 122, and does not necessarily imply that electrically conductive body 122 or radial outer portion 206 is cylindrical or has a circular cross-section. In some embodiments, for example, electrically conductive body 122 may have a square, rectangular, or polygonal cross-section.

Electrically conductive body 122 includes a plurality of internal surfaces defining cavity 202, including a radial inner surface 208 (generally, an inner surface) and a radial outer surface 210 (generally, an outer surface) that at least partially define cavity 202. Radial inner surface 208 defines a first heat exchange interface between electrically conductive body 122 and heat transfer device 200, and radial outer surface 210 defines a second heat exchange interface between electrically conductive body 122 and heat transfer device 200. During operation, heat is transferred between electrically conductive body 122 and heat transfer device 200 through first and second heat exchange surfaces.

In the exemplary embodiment, electrically conductive body 122 is a cylindrical, tubular body, including a radial outer heat transfer surface 212 (generally, an outer heat transfer surface) and a radial inner heat transfer surface 214 (generally, an inner heat transfer surface). Radial inner heat transfer surface 214 is defined by central portion 204 of electrically conductive body 122, and radial outer heat transfer surface 212 is defined by radial outer portion 206 of electrically conductive body 122. In the exemplary embodiment, electrically conductive body 122 also has a ventilation opening 216 defined therein that extends longitudinally through electrically conductive body 122 from first end 124 to second end 126. As shown in FIG. 4, cavity 202 extends circumferentially around ventilation opening 216. Moreover, radial inner heat transfer surface 214 at least partially defines ventilation opening 216, and is in thermal communication with ventilation opening 216 such that heat generated at or around electrical connector device 106 can be dissipated into ventilation opening 216 through radial inner heat transfer surface 214. Ventilation opening 216 permits air flow through electrically conductive body 122, thereby facilitating heat dissipation from electrical connector device 106.

Evaporative heat transfer device 200 is configured to facilitate heat transfer from first end 124 of electrically conductive body 122 to second end 126 of electrically conductive body 122 via phase transitions of one or more working fluids within cavity 202. More specifically, heat transfer device 200 includes a wick 218 disposed within cavity 202, and a working fluid 220 disposed within and at least partially filling the volume of cavity 202.

Wick 218 is configured to retain working fluid 220, and to transfer and distribute working fluid 220 within cavity 202 using, for example and without limitation, capillary action. Wick 218 generally has a porous structure capable of retaining liquid working fluid 220 and transferring liquid working fluid 220 from one end of cavity 202 to the other end of cavity 202 via capillary action or forces. In the exemplary embodiment, wick 218 comprises a sintered copper powder, although wick 218 may have any suitable construction and include any suitable materials that enables heat transfer device 200 to function as described herein. Wick 218 is mechanically or chemically bonded to internal surfaces of electrically conductive body 122 defining cavity 202, and occupies a portion of the volume of cavity 202 such that at least a portion of cavity 202 is unoccupied by wick 218. In the exemplary embodiment, wick 218 is formed by adhering copper powder to the internal surfaces of electrically conductive body 122 defining cavity using suitable adhesives, and the copper powder is sintered by thermally processing electrically conductive body 122.

Working fluid 220 generally includes a vaporizable fluid. Working fluid 220 suitably has a boiling point within the operating temperature ranges of enclosed space 120 and electrically conductive body 122 such that, during operation, heat from electrically conductive body 122 causes working fluid 220 to evaporate. Suitable fluids that may be used as working fluid 220 include, for example and without limitation, water, ammonia, and combinations thereof. Working fluid 220 occupies less than the full volume of cavity 202 such that a portion of working fluid 220 can undergo a phase transformation into gas and enable heat transfer device 200 to function as described herein. Working fluid 220 is retained within wick 218 such that wick 218 is saturated with working fluid 220. In some embodiments, heat transfer device 200 includes a volume of liquid working fluid 220 greater than a saturation capacity of wick 218 such that at least some liquid working fluid 220 is not retained by wick 218 (see FIG. 5).

Figure 5:
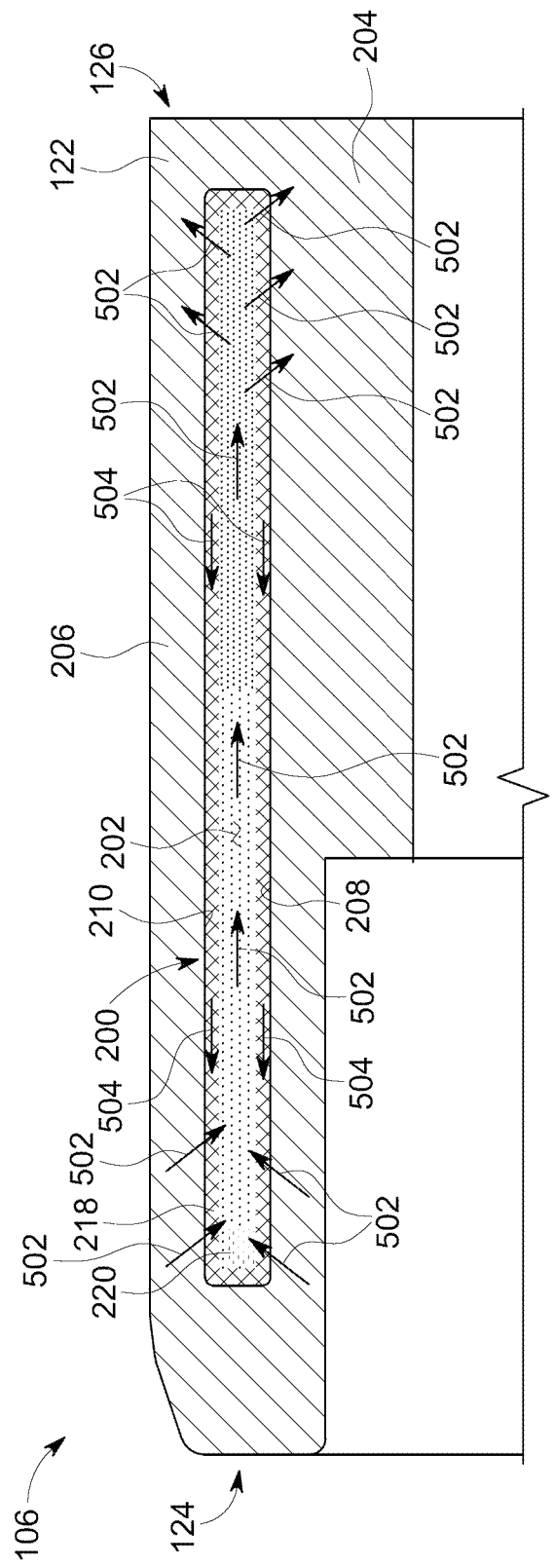
FIG. 5 is an enlarged cross-section of a portion of the electrical connector device shown in FIG. 3 illustrating operation of the evaporative heat transfer device.

FIG. 5 is an enlarged cross-section of a portion of electrical connector device 106 shown in FIG. 3 illustrating operation of evaporative heat transfer device 200. The direction of heat flow within electrically conductive body 122 and heat transfer device 200 is generally indicated by arrows 502.

In operation, first end 124 of electrically conductive body 122 generally has a higher temperature than second end 126 of electrically conductive body 122 due to bus bar 102 acting as a heat sink at second end 126. Thus, as shown in FIG. 5, heat is generally transferred from first end 124 of electrically conductive body 122 towards second end 126 of electrically conductive body 122, and into bus bar 102 (shown in FIGS. 1 and 2). First end 124 thus defines a relatively hot interface of heat transfer device 200, and second end 126 defines a relatively cold interface of heat transfer device 200.

Heat absorbed or generated at first end 124 of electrically conductive body 122 (i.e., hot interface of heat transfer device 200) is transferred to heat transfer device 200 via radial inner surface 208 and radial outer surface 210, and causes working fluid 220 to vaporize within cavity. Vaporized working fluid 220 causes the vapor pressure of working fluid 220 to increase at the end of cavity 202 proximate first end 124, thereby forcing vaporized working fluid 220 through cavity 202 towards second end 126 of electrically conductive body 122 (i.e., cold interface of heat transfer device 200). As vaporized working fluid 220 travels through cavity, vaporized working fluid 220 carries heat energy to the other end of cavity 202. As the vaporized working fluid 220 cools and condenses at second end 126 (i.e., cold interface of heat transfer device 200), working fluid 220 releases its heat of vaporization, and is absorbed by wick 218. Liquid working fluid 220 is then drawn back towards first end 124 of electrically conductive body 122 via capillary action of wick 218, as indicated by arrows 504. Heat is transferred away from heat transfer device 200 at second end 126 of electrically conductive body 122 via radial inner surface 208 and radial outer surface 210.

As noted above, heat transfer device 200 has two heat exchange interfaces, namely a radial inner heat exchange interface defined by radial inner surface 208, and a radial outer heat exchange interface defined by radial outer surface 210. Thus, as compared to known electrical connectors having a single radial heat exchange interface, heat transfer device 200 has a greater number of heat exchange interfaces, and a greater heat exchange surface area, thus providing enhanced heat transfer as compared to known electrical connectors.

Electrical connector devices including an evaporative heat transfer device as described herein may have significantly higher effective thermal conductivities as compared to electrical connector devices without an evaporative heat transfer device. For example, an electrical connector constructed of copper has a thermal conductivity of about 400 Watts per meter-Kelvin (W/(m-K)), whereas electrical connector devices having the same shape and size and including an evaporative heat transfer device as described herein can have effective thermal conductivities of at least 4,000 W/(m-K), at least 40,000 W/(m-K), and even up to about 100,000 W/(m-K).

Figure 6:
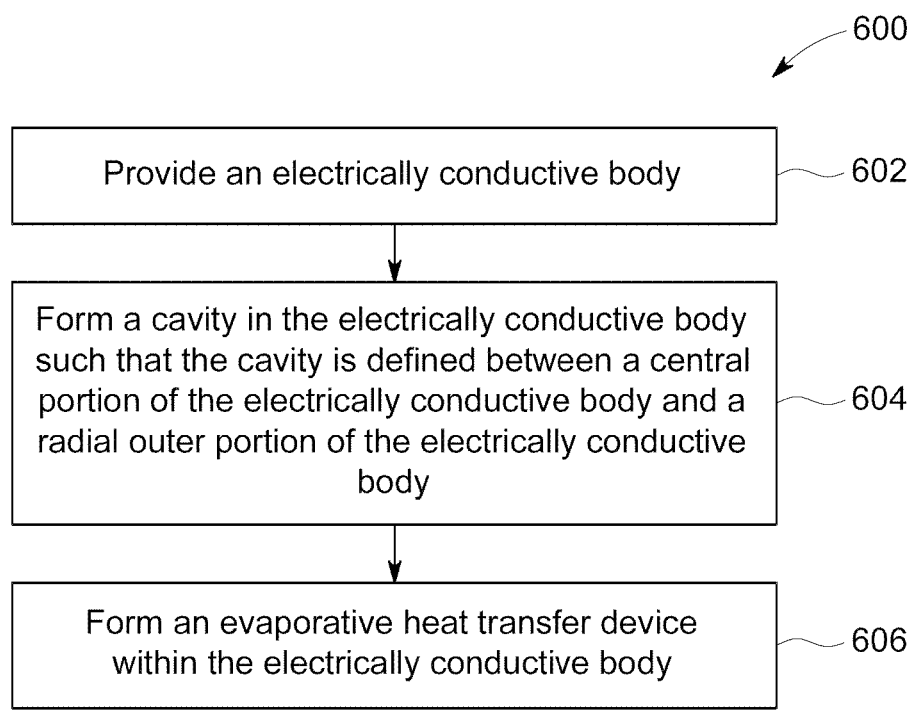
FIG. 6 is a flow chart of an exemplary method of manufacturing an electrical connector device including an evaporative heat transfer device.

FIG. 6 is an exemplary method 600 of manufacturing an electrical connector device including an evaporative heat transfer device, such as electrical connector device 106. Method 600 generally includes providing 602 an electrically conductive body, such as electrically conductive body 122, forming 604 a cavity, such as cavity 202, in the electrically conductive body such that the cavity extends around a central portion of the electrically conductive body, and forming 606 an evaporative heat transfer device, such as heat transfer device 200, within the electrically conductive body. Forming 606 the evaporative heat transfer device includes providing a wick, such as wick 218, within the cavity, providing a working fluid, such as working fluid 220 within the cavity, and sealing the cavity.

Forming 604 the cavity may include any suitable processes for forming a cavity in the electrically conductive body, including, for example and without limitation, drilling and/or machining the cavity in the electrically conductive body. In some embodiments, forming 604 the cavity includes forming an annular cavity that surrounds the central portion of the electrically conductive body.

In some embodiments, providing a wick within the cavity includes adhering a copper powder to internal surfaces of the electrically conductive body defining the cavity using suitable adhesives, and sintering the copper powder via one or more thermal processes.

Sealing the cavity generally includes hermetically sealing the cavity such that the working fluid cannot escape the cavity. The cavity may be sealed, for example, by welding, soldering, and/or sintering conductive material around the cavity such that the cavity is completed enclosed and hermetically sealed within the electrically conductive body.

As compared to some known electrical connector devices, the electrical connector devices described herein utilize an evaporative heat transfer device having a greater number of heat exchange interfaces and surfaces, thereby improving heat transfer and dissipation away from heat generation sources. In particular, the electrical connector devices described herein include a heat transfer device having inner and outer heat exchange interfaces, more specifically, radial inner and outer heat exchange interfaces. Moreover, the electrical connector devices described herein include an electrically conductive body having a radial outer heat transfer surface and a radial inner heat transfer surface. The radial inner and outer heat transfer surfaces and heat exchange surfaces provide a greater number of heat exchange surfaces and overall surface area through which heat can be transferred and dissipated as compared to some known electrical connector devices. Moreover, the electrical connector devices described herein include a unitary or monolithic electrically conductive body, which improves thermal conduction and reduces the number of electrical connection interfaces as compared to some known electrical connector devices.

Exemplary embodiments of electrical connector devices and methods of manufacturing electrical connector devices are described above in detail. The electrical connector devices and methods are not limited to the specific embodiments described herein but, rather, components of the electrical connector devices and/or operations of the methods may be utilized independently and separately from other components and/or operations described herein. Further, the described components and/or operations may also be defined in, or used in combination with, other systems, methods, and/or devices, and are not limited to practice with only the electrical connector devices and switchgear systems described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

PARTS LIST switchgear system . . . 100
bus bar . . . 102
circuit breaker . . . 104
electrical connector device . . . 106
breaker pole . . . 108
breaker arms . . . 110
electrical contacts . . . 112
distal end of breaker arm . . . 114
finger contacts . . . 116
insulating sleeve . . . 118
enclosed space . . . 120
electrically conductive body . . . 122
first end of electrically conductive body . . . 124
second end of electrically conductive body . . . 126
evaporative heat transfer device . . . 200
cavity . . . 202
central portion of electrically conductive body . . . 204
radial outer portion of electrically conductive body . . . 206
radial inner surface . . . 208
radial outer surface . . . 210
outer heat transfer surface . . . 212
inner heat transfer surface . . . 214
ventilation opening . . . 216
wick . . . 218
working fluid . . . 220

What is claimed is:

1. An electrical connector device for connecting a bus bar to one or more electrical contacts of a circuit interrupting device, said electrical connector device comprising:
an electrically conductive body having a first end configured to engage the one or more electrical contacts of the circuit interrupting device, and a second end configured to engage the bus bar, said electrically conductive body defining a ventilation opening extending longitudinally from said first end to said second end, said electrically conductive body including a central portion and an outer portion and having a cavity defined therein between said central portion and said outer portion, said cavity extending circumferentially around said ventilation opening; and
an evaporative heat transfer device comprising a wick and a working fluid each disposed within the cavity defined within said electrically conductive body, said heat transfer device configured to facilitate heat transfer from said first end to said second end.

2. An electrical connector device in accordance with claim 1, wherein said electrically conductive body includes an inner surface and an outer surface, each of said inner surface and said outer surface at least partially defining the cavity within said electrically conductive body, wherein said inner surface defines a first heat exchange interface between said electrically conductive body and said heat transfer device, and said outer surface defines a second heat exchange interface between said electrically conductive body and said heat transfer device.

3. An electrical connector device in accordance with claim 1, wherein said electrically conductive body includes an outer heat transfer surface and an inner heat transfer surface, said inner heat transfer surf ace defined by said central portion of said electrically conductive body.

4. An electrical connector device in accordance with claim 3, wherein said inner heat transfer surface at least partially defines the ventilation opening and is in thermal communication with the ventilation opening.

5. An electrical connector device in accordance with claim 1, wherein the wick comprises sintered copper.

6. An electrical connector device in accordance with claim 1, wherein said electrically conductive body is constructed from a monolithic piece of conductive material.

7. An electrical connector device in accordance with claim 1, wherein the cavity is hermetically sealed and completely enclosed within said electrically conductive body.

8. An electrical connector device in accordance with claim 1, wherein the cavity is an annular cavity.

9. An electrical connector device in accordance with claim 1, wherein the electrically conductive body comprises copper.

10. An electrical connector device in accordance with claim 1, wherein the working fluid comprises water.

11. An electrical switchgear system comprising:
a circuit breaker comprising at least one electrical contact;
a bus bar; and
an electrical connector device configured to conduct electrical current between said bus bar and said circuit breaker, said electrical connector device comprising:
an electrically conductive body having a first end releasably coupled to said at least one electrical contact, and a second end coupled to said bus bar, said electrically conductive body defining a ventilation opening extending longitudinally from said first end to said second end, said electrically conductive body including a central portion and an outer portion, and having a cavity defined therein between said central portion and said outer portion, said cavity extending circumferentially around said ventilation opening; and
an evaporative heat transfer device comprising a wick and a working fluid each disposed within the cavity defined within said electrically conductive body, said heat transfer device configured to facilitate heat transfer to said bus bar.

12. An electrical switchgear system in accordance with claim 11, further comprising an insulating sleeve defining an enclosed space, wherein said at least one electrical contact and said electrical connector device are disposed within the enclosed space defined by said insulating sleeve.

13. An electrical switchgear system in accordance with claim 11, wherein said circuit breaker includes an internal trip mechanism configured to interrupt an electrical connection between said bus bar and a branch circuit electrically coupled to said bus bar via said circuit breaker.

14. An electrical switchgear system in accordance with claim 11, wherein said at least one electrical contact comprises at least one finger contact, wherein said at least one finger contact is biased into engagement with said electrical connector device.

15. An electrical switchgear system in accordance with claim 11, wherein said electrically conductive body includes an inner surface and an outer surface, each of said inner surface and said outer surface at least partially defining the cavity within said electrically conductive body, wherein said inner surface defines a first heat exchange interface between said electrically conductive body and said heat transfer device, and said outer surface defines a second heat exchange interface between said electrically conductive body and said heat transfer device.

16. A method of manufacturing an electrical connector device including an evaporative heat transfer device, said method comprising:
  forming a cavity in an electrically conductive body such that the cavity is defined between a central portion of the electrically conductive body and an outer portion of the electrically conductive body;
  forming a ventilation opening in the electrically conductive body such that (i) the cavity extends circumferentially around the ventilation opening and (ii) the ventilation opening extends longitudinally from a first end of the electrically conductive body to a second end of the electrically conductive body; and
  forming an evaporative heat transfer device within the electrically conductive body, wherein forming the evaporative heat transfer device comprises:
    providing a wick within the cavity;
    providing a working fluid within the cavity; and
    sealing the cavity.

17. A method in accordance with claim 16, wherein forming the cavity comprises forming an annular cavity that surrounds the central portion of the electrically conductive body.

18. A method in accordance with claim 16, wherein providing the wick comprises adhering a conductive powder to at least one internal surface of the electrically conductive body and sintering the conductive powder.

* * * * *